United States Patent
Yin et al.

(10) Patent No.: US 10,708,761 B1
(45) Date of Patent: Jul. 7, 2020

(54) SUPPORTING MULTIPLE ENABLED PROFILES ON SINGLE EMBEDDED SUBSCRIBER IDENTITY MODULE (ESIM) CHIP

(71) Applicant: Google LLC, Mountain View, CA (US)

(72) Inventors: Jun Yin, Fremont, CA (US); Timothy Auer, Mountain View, CA (US); Aguibou Barry, Mountain View, CA (US); Grace Chen, Mountain View, CA (US); Matthew Resman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/711,754

(22) Filed: Dec. 12, 2019

Related U.S. Application Data

(60) Provisional application No. 62/896,275, filed on Sep. 5, 2019.

(51) Int. Cl.
H04M 3/00 (2006.01)
*H04W 8/18* (2009.01)
*H04W 8/20* (2009.01)

(52) U.S. Cl.
CPC ........... *H04W 8/183* (2013.01); *H04W 8/205* (2013.01)

(58) Field of Classification Search
None
See application file for complete search history.

(56) References Cited

U.S. PATENT DOCUMENTS

| | | | |
|---|---|---|---|
| 9,439,062 B2 | 9/2016 | Li et al. | |
| 9,531,831 B1* | 12/2016 | Cuadrat | H04L 67/303 |
| 2015/0350878 A1* | 12/2015 | Li | H04W 8/20 455/558 |
| 2016/0020802 A1* | 1/2016 | Lee | H04B 1/3816 455/558 |
| 2016/0105540 A1* | 4/2016 | Kwon | H04N 21/41407 715/747 |
| 2019/0357044 A1* | 11/2019 | Park | H04W 12/06 |
| 2020/0008049 A1* | 1/2020 | Namiranian | H04W 12/001 |

* cited by examiner

*Primary Examiner* — Erika A Washington
(74) *Attorney, Agent, or Firm* — Honigman LLP; Brett A. Krueger; Grant Griffith

(57) ABSTRACT

A method for enabling multiple subscriber identification module (SIM) profiles on a single embedded SIM includes installing a first SIM profile associated with a first mobile communication service that a user subscribes to and installing a second SIM profile associated with a second mobile communication service that the user subscribes to that is different than the first mobile communication service. The method also includes simultaneously enabling the first SIM profile to communicate with data processing hardware via a dedicated first communication interface and the second SIM profile to communicate with the data processing hardware via a dedicated second communication interface. The method also includes when using the enabled first SIM profile and the enabled second SIM profile, connecting to the first mobile communication service and the second mobile communication service simultaneously.

24 Claims, 6 Drawing Sheets

SUPPORTING MULTIPLE ENABLED PROFILES ON SINGLE EMBEDDED SUBSCRIBER IDENTITY MODULE (ESIM) CHIP

CROSS REFERENCE TO RELATED APPLICATIONS

This U.S. patent application claims priority under 35 U.S.C. § 119(e) to U.S. Provisional Application 62/896,275, filed on Sep. 5, 2019, which is hereby incorporated by reference in its entirety.

TECHNICAL FIELD

This disclosure relates to supporting multiple enabled profiles on a single embedded subscriber identification module (eSIM) chip.

BACKGROUND

Telephony devices, such as cellular phones and tablets, include subscriber identification modules (SIMs) that are used by a mobile network operator (MNO) to identify and authenticate network subscribers. Each SIM includes one or more SIM profiles that allow the subscriber to use services offered by the MNO. When a subscriber wants to utilize services from different MNOs (or different services from the same MNO) simultaneously, a separate SIM profile must be enabled for each MNO.

However, typically SIMs only support a single active profile at a time. Thus, currently subscribers that desire to use services from multiple MNOs simultaneously must use a device that supports multiple SIMs (one for each active profile). In addition to increasing complexity in profile management, multiple SIMs increases both hardware cost and power consumption of devices.

SUMMARY

One aspect of the disclosure provides a method for enabling multiple subscriber identification module (SIM) profiles on a single embedded SIM. The method includes installing, by data processing hardware of a user device associated with a user, a first SIM profile associated with a first mobile communication service that the user subscribes to. The method also includes installing, by the data processing hardware, a second SIM profile associated with a second mobile communication service that the user subscribes to. The second mobile communication service is different than the first mobile communication service. The method also includes simultaneously enabling, by the data processing hardware, the first SIM profile to communicate with the data processing hardware via a dedicated first communication interface and the second SIM profile to communicate with the data processing hardware via a dedicated second communication interface. The first communication interface connects the embedded SIM to the data processing hardware, and the second communication interface also connects the embedded SIM to the data processing hardware. The method also includes when using the enabled first SIM profile and the enabled second SIM profile, connecting, by the data processing hardware, to the first mobile communication service and the second mobile communication service simultaneously.

Implementations of the disclosure may include one or more of the following optional features. In some implementations, the first mobile communication service and the second mobile communication service include a same type of mobile communication service. In some examples, the first mobile communication service includes a different type of mobile communication service than the second mobile communication service. Optionally, the first mobile communication service and the second mobile communication service are associated with a same mobile network operator (MNO).

In some implementations, the first mobile communication service is associated with a first MNO and the second mobile communication service is associated with a second MNO different than the first MNO. The first communication interface may be associated with a first physical interface and the second communication interface may be associated with a second physical interface. The second physical interface is independent from the first physical interface. The first physical interface and the second physical interface may include independent ISO7816 interfaces.

In some examples, the first physical interface and the second physical interface use a T=0 transmission protocol. Optionally, the first communication interface and the second communication interface are multiplexed on a single physical interface. In some implementations, the first communication interface and the second communication interface are multiplexed on the single physical interface using a T=1 transmission protocol. The method may further include, in response to connecting to the first mobile communication service and the second mobile communication service simultaneously, adjusting, by the data processing hardware, a schedule of embedded SIM operations. The schedule of embedded SIM operations may include SIM reset operations. The first SIM profile, in some examples, is associated with a first identification and the second SIM profile is associated with a second identification. The first identification is the same as the second identification.

Another aspect of the disclosure provides a user device that includes an embedded subscriber identification module (SIM), a baseband processor connected to the embedded SIM via two or more communication interfaces, and memory hardware in communication with the baseband processor and storing instructions that when executed by the baseband processor cause the baseband processor to perform operations. The operations include installing a first SIM profile associated with a first mobile communication service that the user subscribes to. The operations also include installing a second SIM profile associated with a second mobile communication service that the user subscribes to. The second mobile communication service is different than the first mobile communication service. The operations also include simultaneously enabling the first SIM profile to communicate with the baseband processor via a dedicated first communication interface and the second SIM profile to communicate with the baseband processor via a dedicated second communication interface. The first communication interface connects the embedded SIM to the baseband processor, and the second communication interface also connects the embedded SIM to the baseband processor. The operations also include when using the enabled first SIM profile and the enabled second SIM profile, connecting to the first mobile communication service and the second mobile communication service simultaneously.

This aspect may include one or more of the following optional features. In some implementations, the first mobile communication service and the second mobile communication service include a same type of mobile communication service. In some examples, the first mobile communication service includes a different type of mobile communication service than the second mobile communication service. Optionally, the first mobile communication service and the second mobile communication service are associated with a same mobile network operator (MNO).

In some implementations, the first mobile communication service is associated with a first MNO and the second mobile communication service is associated with a second MNO different than the first MNO. The first communication interface may be associated with a first physical interface and the second communication interface may be associated with a second physical interface. The second physical interface is independent from the first physical interface. The first physical interface and the second physical interface may include independent ISO7816 interfaces.

In some examples, the first physical interface and the second physical interface use a T=0 transmission protocol. Optionally, the first communication interface and the second communication interface are multiplexed on a single physical interface. In some implementations, the first communication interface and the second communication interface are multiplexed on the single physical interface using a T=1 transmission protocol. The operations may further include, in response to connecting to the first mobile communication service and the second mobile communication service simultaneously, adjusting a schedule of embedded SIM operations. The schedule of embedded SIM operations may include SIM reset operations. The first SIM profile, in some examples, is associated with a first identification and the second SIM profile is associated with a second identification. The first identification is the same as the second identification.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
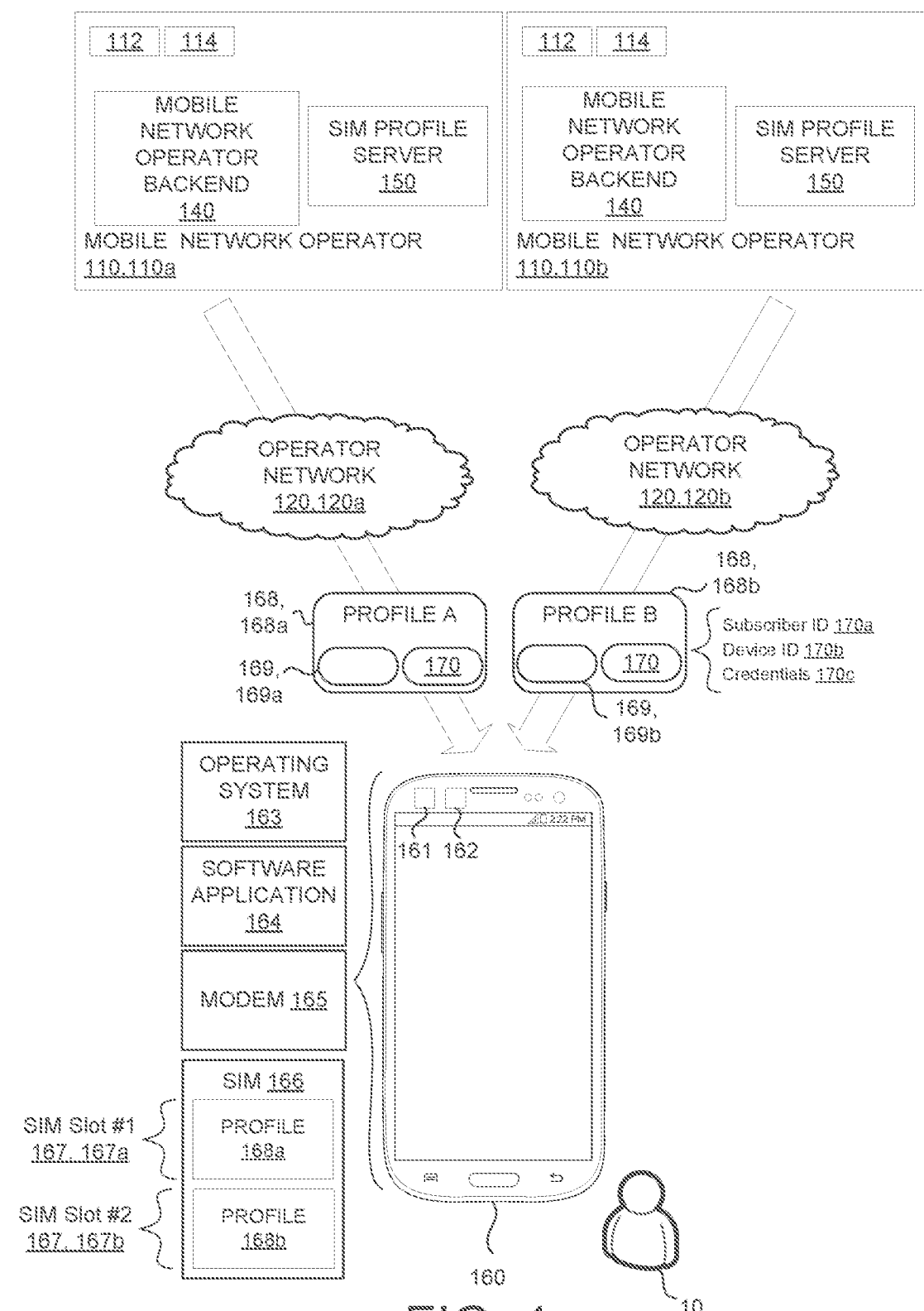
FIG. 1 is a schematic view of an example wireless communication system.

Subscriber identification modules (SIM) are used by a mobile network operator (MNO) to identify and authenticate user devices (e.g., mobile phones) used by network subscribers/customers and to identify services available to the subscribers. For example, when a subscriber wants to transfer a device from one cellular service to different cellular service, a SIM profile associated with the subscriber and old cellular service must be switched to a SIM profile associated with the subscriber and the new cellular service. Typically, user devices are provided with physical SIM (pSIM) cards that include a single SIM profile and must be exchanged with another pSIM card to allow the subscriber to transfer from one cellular service to another. More recently, user devices are being provided with an embedded SIM (eSIM) integrated into the circuitry of the user device. Here, the eSIM chips may store multiple profiles simultaneously, but current eSIM specifications only support enabling a single profile per chip at a time. This limitation makes it difficult for subscribers to connect to two different cellular services simultaneously. For example, a subscriber may desire to manage Dual SIM Dual Standby (DSDS) or Dual SIM Dual Active (DSDA) capabilities.

Typically, to manage DSDS or DSDA capabilities on a single user device, subscribers must rely on two separate eSIM chips, two separate pSIM cards, or one eSIM chip and one pSIM card with a desired active profile on each chip/card. These profiles cannot be exported or moved between eSIM chips locally and may only be stored on a single eSIM at a time. Thus, in order to move profiles between eSIM chips (and therefore enable different profiles), the subscriber must interact with the mobile network operator (MNO) or carrier to delete the profile and re-download/install the profile to the correct eSIM chip. This process is inconvenient at best, and outright infeasible when the user device does not have a data connection to the MNO or when the MNO does not support moving profiles. Moreover, the requirement of two eSIM chips increases hardware cost and complexity.

Implementations herein are directed towards enabling multiple SIM profiles on a single eSIM chip simultaneously. Each SIM profile is associated with an MNO and a respective service that the user has subscribed to. The user of the user device may access and use the services of each of the active profiles simultaneously. The user device downloads and installs each profile to a single eSIM chip, and each profile is associated with a dedicated communication interface. Each communication interface provides an independent communication channel between the user device (e.g., modem of the user device) and the respective SIM profile installed on the eSIM chip. In some examples, each communication interface is associated with its own independent physical interface (e.g., ISO7816). In other examples, each communication interface is associated with a respective independent logical interface multiplexed on a single physical interface with the independent logical interfaces associated with the other communication interfaces. Thus, the implementations provided herein increase user experience by allowing users to switch between and enable multiple SIM profiles simultaneously without contacting the associated MNO(s). Furthermore, the implementations provided herein may reduce complexity of managing multiple SIM profiles, reduce hardware footprint, and reduce power consumption.

Referring to FIG. 1, an example communications system 100 includes a user device 160 in communication with a carrier or first mobile network operator (MNO) 110, 110a via a first operator network 120, 120a (also referred to as "carrier network") and an second MNO 110b via a second operator network 120b. Described in greater detail below, the user device 160 has a first corresponding SIM profile 168, 168a to provide the user device 160 access to one or more network services 169, 169a (e.g., voice service, data service, messaging service, etc.) associated with the first operator network 120a. The user device 160 also includes a second corresponding SIM profile 168, 168b to provide the user device 160 access to one or more services 169b associated with the second operator network 120b. The MNOs 110a, 110b may be the same entity or a different entities, and similarly services 169a, 169 may include the same or different types of services. For example, SIM profile 'A' 168a may provide access to a voice communication service 169a from the first MNO 110a while the SIM profile 'B' 168b may provide a data communication service 169b from the second MNO 110b different than the first MNO 110a, whereby the user device can use SIM profile 'A' 168a to access the voice communication service 169a via the first operator network 120a provided by the first MNO 110a and use SIM profile 'B' 168b to simultaneously access the data communication service 169b via the second operator network 120b provided by the second MNO 110b. On the other hand, the first and second MNOs 110a, 110b may be the same and the SIM profiles 168a. 168b may each provide simultaneous access to voice communication services 169a, 169b, whereby each voice communication service 169a, 169b is associated with a different telephone number (e.g., service 169a corresponds to a work telephone number for the user and service 169b corresponds to a personal telephone number for the user. Other combinations of same or different MNOs and same or different types of services are within the spirit and scope of the implementations herein.

The MNOs 110a, 110b may reside on remote systems or computing devices. The remote system may be a single computer, multiple computers, or a distributed system (e.g., a cloud environment) having scalable elastic computing resources 112 (e.g., data processing hardware) and/or storage resources 114 (e.g., memory hardware). In some examples, the data processing hardware 112 (e.g., using instructions stored on the memory hardware 114) executes a MNO backend 140 (e.g., one or more Entitlement Servers) configured to provide backend services to manage access to the operator network 120. The data processing hardware 112 may also execute a profile server 150 (or optionally communicate with the profile server 150) configured to generate and provide SIM profiles 168 for use by user devices 160 of the operator network 120. For instance, user devices 160 may be associated with customers of the MNO 110 that have access to the operator network 120 when the MNO 110 authorizes their respective SIM profiles 168. The profile server 150 may be a Subscription Manager (SM), a Subscription Manager Plus (SM+), a Subscription Manager Data Preparation (SM-DP), a Subscription Manager Data Preparation Plus (SM-DP+), a Subscription Manager Secure Routing Plus (SM-SR+), a Profile Delivery Platform, Profile Delivery Server, or any other server or combination of servers capable of generating SIM profiles 168. The MNO 110 may include multiple profile servers 150.

Each operator network 120, 120a, 120b may include, but is not limited to, Wide Area Networks (WAN) such as a Long Term Evolution (LTE) network, a Global System for Mobile Communications (GSM) network, a Code Division Multiple Access (CDMA) network, a Wideband Code Division Multiple Access (WCDMA) network or an Enhanced Data rates for GSM Evolution (EDGE) network, and Wireless Local Area Networks (WLAN) such as the various IEEE 802.11 standards, or any other kind of wireless network. Access to the operator network 120 is controlled by the associated MNO 110, which only grants access to user devices 160 having SIM profiles 168 that are authorized by the MNO backend 140.

In some examples, each SIM profile 168, in addition to a list of any authorized services 169, includes data 170 that is used to register and/or enable the subscriber and the user device 160 access to the operator network 120. For example, the SIM profile 168 may include a subscriber identifier (ID) 170a, a user device ID, and credentials 170c used by the MNO to authenticate or authorize the subscriber/user device and enable access to the operator network 120. In some implementations, the user device 160 communicates with the MNO 110 to add or delete profiles 168 from the user device (e.g., communicate with SIM profile server 150). Optionally, a profile 168 already downloaded to a user device 160 may only be re-downloaded to the device after the MNO 110 confirms deletion of the previous profile 168 (e.g., by receiving a signed deletion notification).

The user device 160 can be any computing device that is capable of wireless communications via the operator networks 120. FIG. 1 shows an example user device 160 having data processing hardware 161 (e.g., a baseband processor) and memory hardware 162 in communication with the data processing hardware 161. The user device 160 includes, but is not limited to, mobile computing devices, such as laptops, tablets, smart phones, and wearable computing devices (e.g., headsets and/or watches). The user device 160 could also include smart appliances (e.g., smart speakers/displays). In the example shown, the user device 160 is configured to support one or more of the types of the networks 120 (e.g., GSM, CDMA, etc.).

The user device 160 may use a variety of different operating systems 163. In examples where a user device 160 is a mobile device, the user device 160 may run an operating system including, but not limited to, ANDROID® developed by Google Inc., IOS® developed by Apple Inc., or WINDOWS PHONE® developed by Microsoft Corporation. Accordingly, the operating system 163 running on the user device 160 may include, but is not limited to, one of ANDROID®, IOS®, or WINDOWS PHONE®. In some examples a user device may run an operating system including, but not limited to, MICROSOFT WINDOWS® by Microsoft Corporation, MAC OS® by Apple, Inc., or Linux. The user device 160 may also access the operator networks 120 while running operating systems 163 other than those operating systems 163 described above, whether presently available or developed in the future. The operating system 163 may execute one or more software applications 164.

A software application 164 (i.e., a software resource) may refer to computer software that causes a computing device to perform a task. In some examples, the software application 164 may be referred to as an "application," an "app," or a "program." Example applications 164 include, but are not limited to, MNO access applications, word processing applications, spreadsheet applications, messaging applications, media streaming applications, social networking applications, and games. Applications 164 can be executed on a variety of different user devices 160. In some examples, applications 164 are installed on the user device 160 prior to a user 10 purchasing the user device 160. In other examples, the user 10 may download and install applications 164 on the user device.

The user device 160 further includes at least one modem 165 (also referred to as a baseband or baseband processor). The modem 165 includes one or more antennas that enable the user device to communicate with the operator networks 120 wirelessly. The modem 165 may communicate with one or more radios operating on a variety of frequencies simultaneously (e.g., 700 MHz, 900 MHz, etc.). The modem 165 may include various components to provide transmit and receive functions (a processor, memory, etc.). In some implementations, data processing hardware includes the modem. That is, tasks executed by the data processing hardware 161, in some examples may instead be executed by the modem 165 and vice versa.

The user device 160 further includes a corresponding subscriber identification module (SIM) 166 with one or more SIM slots 167a-b, each configured to store a corresponding SIM profile 168a-b for identifying and connecting the user device 160 with certain types of wireless networks. For instance, the SIM 166 may include a first SIM profile 168a installed in SIM slot #1 167a with the credentials 170c for authorizing the user device 160 to connect with the operator network 120a and access service 169a. Similarly, the SIM 166 may include a second SIM profile 168b installed in SIM slot #2 167b with the credentials 170c for authorizing the user device 160 to connect with the operator network 120b and access service 169b. In this regard, when either operator network 120a-b is within range of the user device 160, the user device 160 will utilize the stored network credentials 170c on the SIM 166 in order to gain access to the respective operator network 120a-b.

In some examples, the SIM 166 is an embedded SIM (eSIM) 166 with the credentials 170c for connecting the user device 160 with the operator networks 120 stored directly on the memory hardware 162 of the user device 160. Here, when installing profiles 168 on the user device 160 using eSIM 166, the user device 160 may download each SIM profile 168 from the respective MNO 110.

Figure 2A:
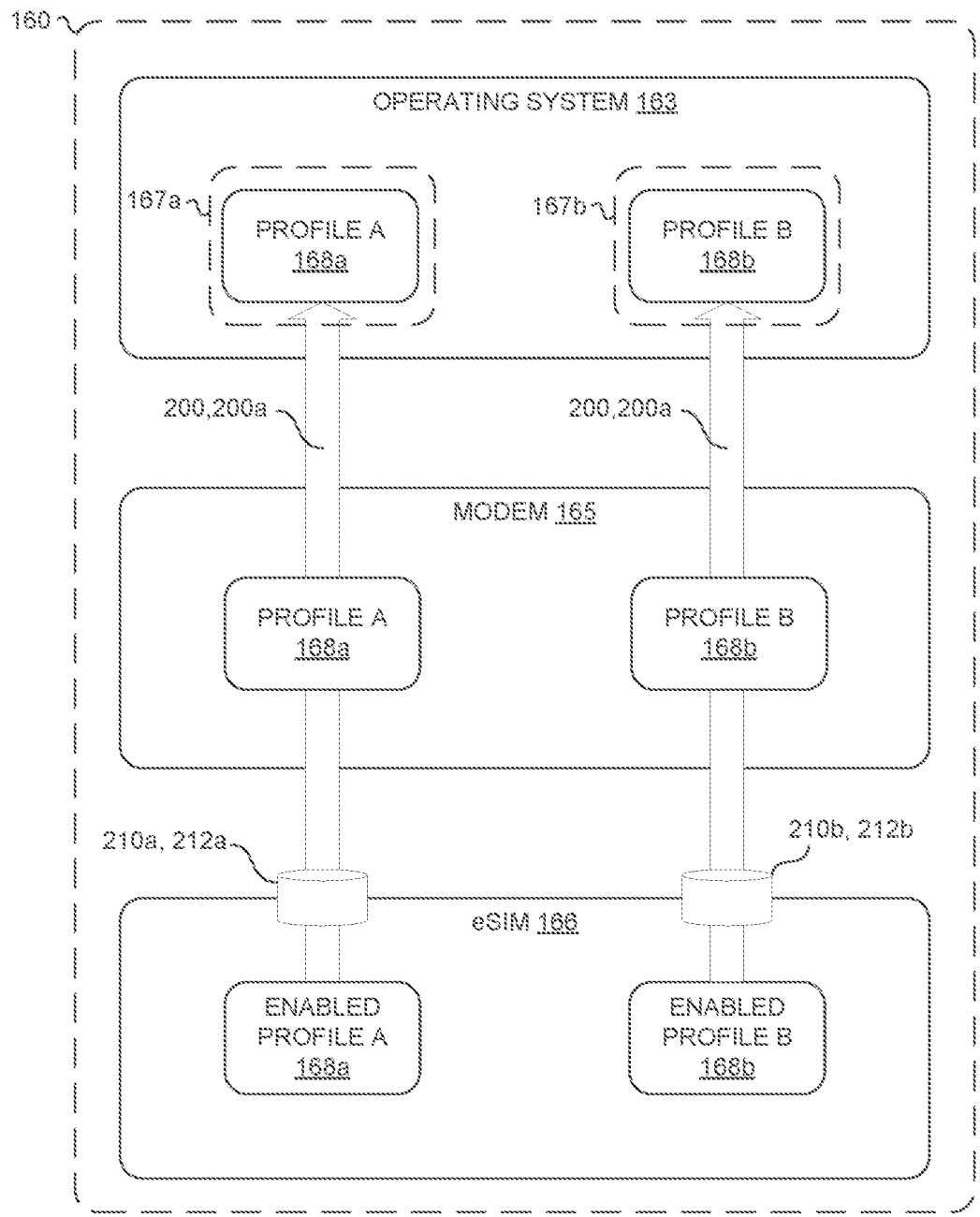
FIG. 2A is a schematic view of an embedded subscriber entity module (eSIM) chip with multiple physical interfaces.
Figure 2B:
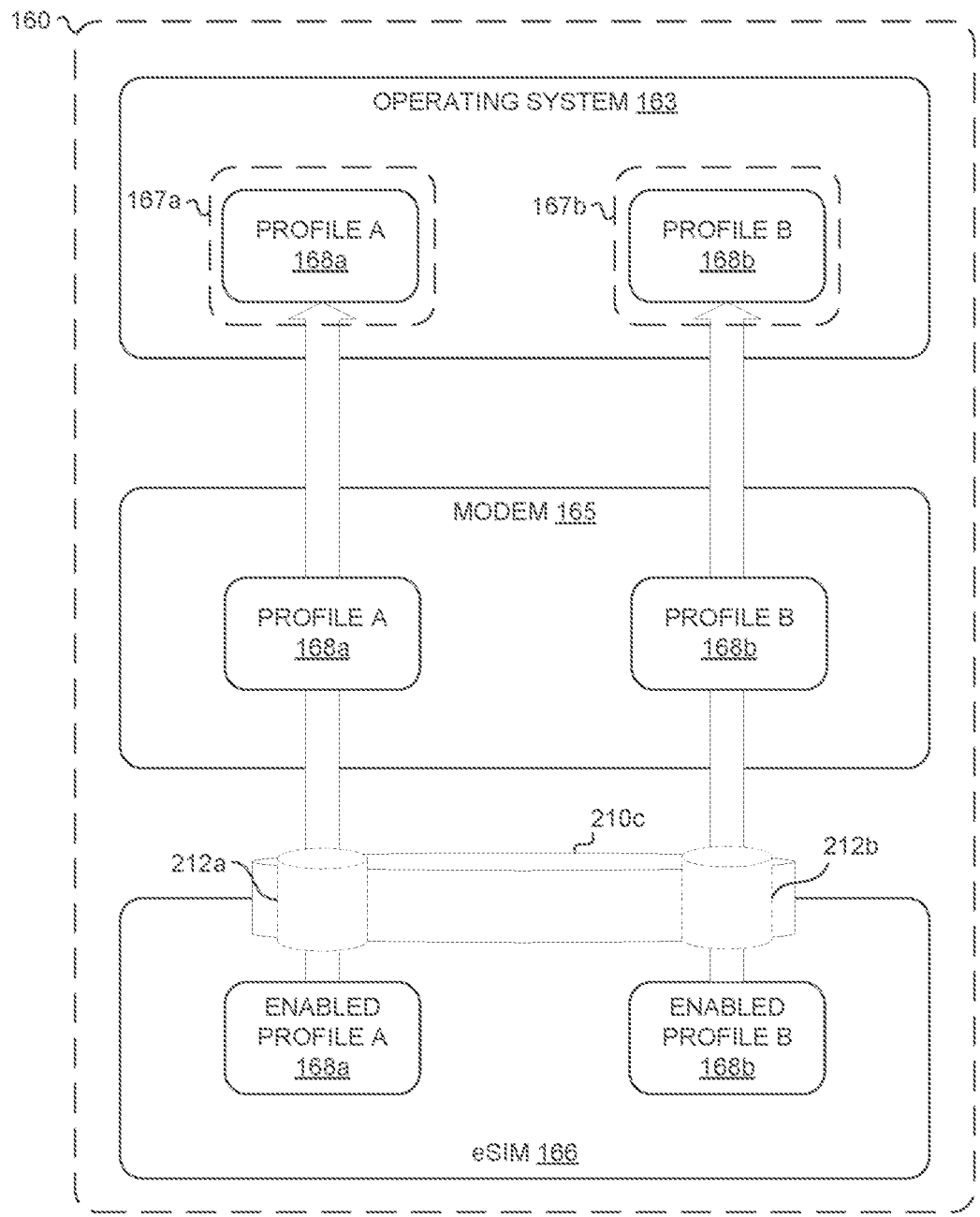
FIG. 2B is a schematic view of an eSIM chip with a single physical interface multiplexed into multiple logical interfaces.

Referring now to FIGS. 2A and 2B, the user device 160 facilitates enabling multiple profiles 168 simultaneously by assigning each profile 168 to be enabled to a dedicated communication interface 200, 200a-b. Here, the eSIM 166 includes two downloaded and enabled SIM profiles 168a, 168b installed thereon and associated with a respective slot 167a, 167b. Referring to FIG. 2A, in some examples, each dedicated communication interface 200, 200a-b includes an independent physical interface 210, 210a-b. Here, the first SIM profile 168a is assigned to a first physical interface 210a that connects the eSIM 166 to the modem 165 and the operating system 163, and the second SIM profile 168b is assigned to a second physical interface 210b that connects the eSIM 166 to the modem 165 and the operating system 163. Thus, the enabled profile 168a communicates with the modem 165 via the first physical interface 210a and the enabled profile 168b communicates with the modem 165 via the second physical interface 210b. Each physical interface 210a, 210b corresponds to a physical channel connecting the eSIM 166 to other user device 160 components (e.g., the modem 165, the data processing hardware 161, etc.). The connection is established by physical wires/buses. For example, the first physical interface 210a includes physical wires from the eSIM 166 to the modem 165 that are separate and independent from the physical wires of the second physical interface 210b (that also connect the eSIM 166 to the modem 165). Each physical interface 210a, 210b may include an International Organization for Standardization (ISO) interface (e.g., ISO7816), a serial peripheral (SPI) interface, an inter-integrated circuit (I2C) interface, or other type of physical interface. In some examples, each physical interface 210a, 210b also provides at least one respective logical interface 212a-b. Here, each logical interface 212a, 212b is a respective logical channel supported by a respective independent physical interface 210. In other examples, a single multiplexed physical interface 210c (FIG. 2B) provides multiple logical interfaces 212a, 212b (FIG. 2B).

In some examples, each physical interface 210a, 210b also allows for communication between the operating system 163 (e.g., via data processing hardware 161) and the eSIM 166. In the example shown, the first physical interface 210a is associated with the first SIM slot 167a for communicating the enabled first SIM profile 168a from the eSIM 166 to the operating system 163, while the second physical interface 210b is associated with the second SIM slot 167b for communicating the enabled second SIM profile 168b from the eSIM 166 to the operating system 163. That is, the operating system 163 may register each SIM slot 167a, 167b to represent, to the operating system 163, a respective connection backed by a respective logical interface 212a, 212b to the eSIM 166 that holds an enabled respective SIM profile 168a, 168b. Still referring to FIG. 2A, as each enabled profile 168a, 168b has its own independent physical interface 210a, 210b, no multiplexing of the physical interfaces 210a, 210b is required to provide the logical interfaces 212a, 212b. Each physical interface 210a, 210b, in some examples, uses a T=0 transmission protocol. Because many modems 165 support two or more physical interfaces (e.g., ISO interfaces), the modem 165 typically does not need major modifications to support implementations herein. While the example of FIG. 2A depicts two SIM profiles 168a, 168b installed on respective slots 167a, 167b of the eSIM 166 and enabled for simultaneously communication with the modem 165 and operating system 163 via respective physical interfaces 210a, 210b, more than two SIM profiles may be installed on respective slots of the eSIM 166 and enabled for simultaneous communication via more than two respective physical interfaces.

Referring now to FIG. 2B, in some implementations, a user device 160 with an eSIM chip 166 includes a single physical interface 210c. The single physical interface 210c may be multiplexed to support multiple logical interfaces 212a-b. Here, the first communication interface 200a includes the first logical interface 212a multiplexed from the single physical interface 210c and the second communication interface 200b includes the second logical interface 212b multiplexed from the single physical interface 210c. That is, each enabled profile 168a-b has a separate respective logical interface 212a-b as in FIG. 2A, but shares the single physical interface 210c via, for example, the T=1 transmission protocol. Similar to the example shown in FIG. 2A, the logical interfaces 212a, 210b of FIG. 2B are in communication with the modem 165 and the operating system 163, where each profile 168a, 168b is represented as being held in a respective SIM slot 167. In the example shown, the first logical interface 212a is associated with the first SIM slot 167a for communicating the enabled first SIM profile 168a from the eSIM 166 to the operating system 163, while the second logical interface 210b is associated with the second SIM slot 167b for communicating the enabled second SIM profile 168b from the eSIM 166 to the operating system 163. That is, the operating system 163 may register each SIM slot 167a, 167b to represent, to the operating system 163, a respective connection backed by a respective logical interface 212a, 212b to the eSIM 166 that holds an enabled respective SIM profile 168a, 168b. In other configurations, more than two SIM profiles may be installed on the eSIM 166 and assigned to respective logical interfaces multiplexed onto the single physical interface 210c without departing from the scope of the present disclosure.

Figure 3:
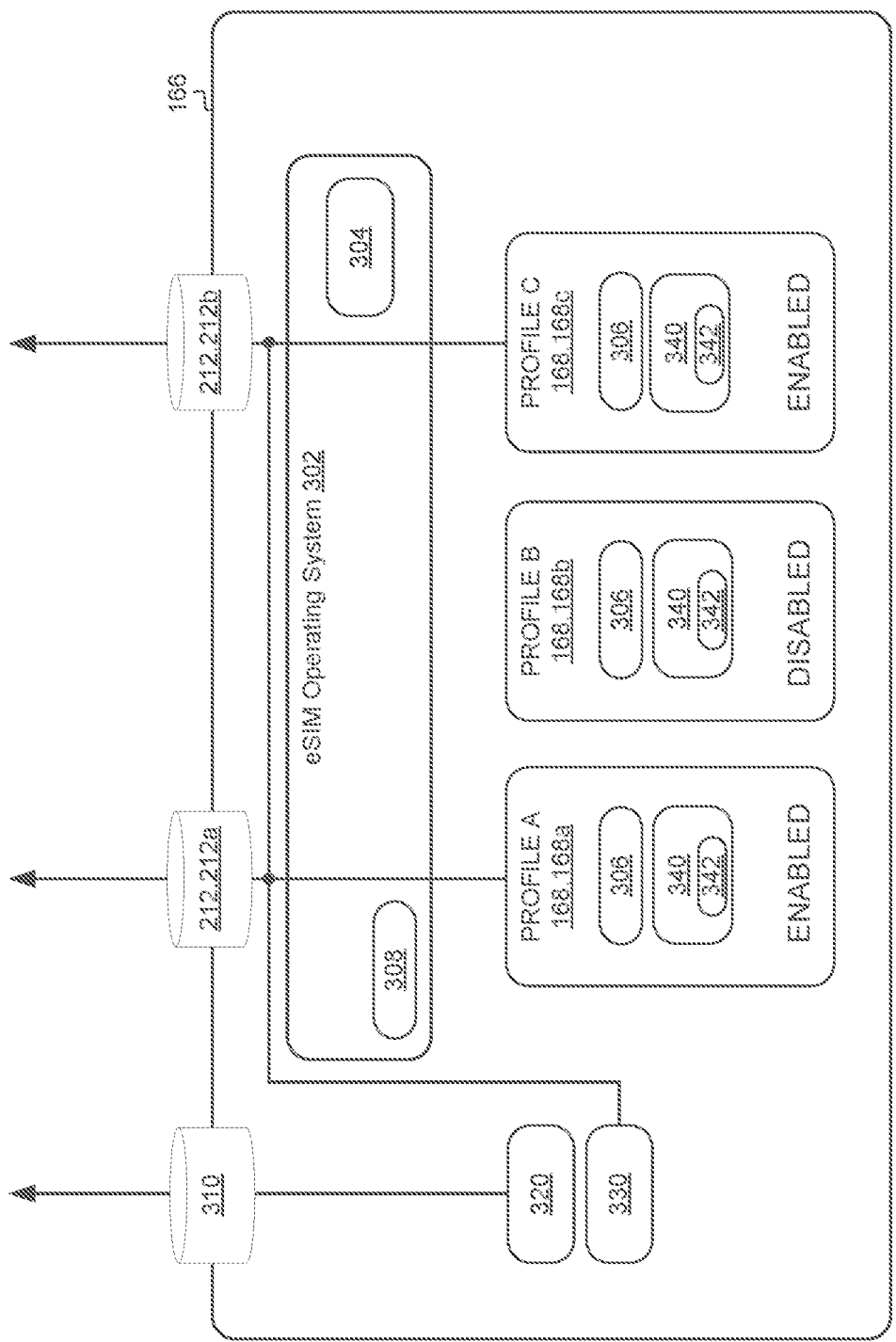
FIG. 3 is a schematic view of an eSIM chip with multiple active profiles.

Referring now to FIG. 3, an exemplary eSIM chip 166 with two logical interfaces 212, 212a-b is shown. The logical interfaces 212 may have independent physical interfaces 210a, 210b (FIG. 2A) or be multiplexed onto a single physical interface 210c (FIG. 2B). The eSIM chip may include an eSIM operating system 302 (i.e., firmware executing on the eSIM chip). The eSIM operating system 302 may include a variety of modules 304 (e.g., profile policies, profile package interpreter, telecom framework, etc.). In some implementations, the eSIM operating system 302 also directs communications between the profiles 168 and the logical interfaces 212. For example, the logical interfaces may interface with an issuer security domain (ISD-P) 306 of the profiles 168. Additionally or alternatively, each logical interface may also have access to an issuer security domain (ISD-R) 330 of the eSIM chip. In some examples, the eSIM chip 166 includes other physical interfaces 310 (e.g., an SPI interface 310) that do not connect to the profiles 168. The other interface 310 may instead connect with other modules of the eSIM chip 166. For example, the modules may include an embedded universal integrated circuit card (eUICC) controlling authority security domain (ECASD), an eUICC bootloader, and/or other common secure domains (i.e., ISD-NT) to serve other functionality (e.g., authentication via near-field communication).

The eSIM chip 166 may download and install any number of SIM profiles 168. For example, the example shown in FIG. 3 has Profile A 168a, Profile B 168b and Profile C 168c installed therein. Here, Profile A 168a and Profile C 168c are enabled while Profile B 168 is disabled. Accordingly, Profile A 168a is connected to interface 212a and Profile C 168c is connected to interface 212b. Enabled profiles 168 may be disabled and different disabled profiles 168 may then be routed to the interfaces 212 and enabled. For example, Profile C 168c may be disabled and Profile B 168b subsequently assigned to interface 212b and enabled. The user 10 would then gain access to the services 169 authorized by Profile C 168c.

While, from the modem's perspective, knowledge of multiple enabled profiles 168 on the same eSIM chip 166 is not required (thus allowing for backward compatibility with current systems), it may be advantageous to provide an indication to the modem 165 of the multiple enabled SIM profiles 168 so that the modem 165 (or data processing hardware 161) may adjust scheduling of certain eSIM chip 166 operations. For example, when SIM profiles are enabled on separate and independent SIM chips, the modem 165 (or data processing hardware 161) may issue a SIM reset to one SIM chip without affecting the performance of the other SIM chip. However, such a SIM reset when multiple SIM profiles 168 are enabled on the same eSIM chip 166 may negatively affect performance. When the modem 165 receives an indication that multiple enabled profiles 168 share the same eSIM chip 166, the modem 165 may adjust scheduling of such SIM operations (e.g., SIM reset or SIM refresh) accordingly. For example, when the modem 165 wishes to issue a reset to one of the SIM profiles 168, the modem 165 may check if either profile 168 is busy. When either is busy, the modem 165 may delay issuing the SIM reset until both profiles 168 are not busy to avoid negatively affecting performance of the SIM profile 168 that does not need to be rest (but may be reset along with the SIM profile 168 that is intended to be reset).

In some examples, each eSIM chip 166 is associated with an identifier (i.e., an eUICC ID or EID) 308. The modem may query each eSIM chip 166 of a user device 160 to uniquely identify each eSIM chip 166 installed or loaded into each SIM slot 167. Here, the eSIM chip 166 (or specifically, the eSIM operating system 302) may return the same identifier 308 when queried for each SIM slot 167 that has an active profile 168 of the eSIM chip 166. Because when two separate eSIM chips are present, each will have unique identifiers 308, returning the same identifier 308 for both SIM slots 167 may indicate to the modem 165 that multiple enabled profiles 168 reside on the same eSIM chip 166 and/or indicate to the modem 165 and/or data processing hardware 161 to adjust the schedule of SIM operations (e.g., SIM reset) accordingly.

In some implementations, each profile 168 includes one or more applets 340. These applets 340 are dedicated to fulfilling a particular task independent from standard MNO 110 services 169. For example, an applet 340 may report diagnostic data about the user device 160 or operator network 120. Each applet typically is associated with an applet identifier 342 unique to that applet 340. In some cases, the same applet 340 may be installed on two or more enabled profiles 168 and each applet 340 would then share the same applet identifier 342. To ensure this does not cause a conflict, the SPI interface 310 may include access to a global registry 320 for applet identifiers 342. Each SIM slot 167 may manage its own global registry 320 so that the eSIM operating system 302 may serve two enabled profiles 168 that include applets 340 with the same applet identifier 342.

Thus, implementations herein are directed toward a method and system for simultaneously enabling multiple SIM profiles on a single eSIM chip while still being fully backward compatible with current eSIM solutions and specifications. While the examples herein are directed toward enabling multiple profiles on an eSIM chip, other similar technologies are applicable as well. For example, integrated universal integrated circuit card (iUICC) may use two applications instead of two chips or integrated smart secure platform (iSSP) may use two bundles. However, the same principles apply.

Figure 4:
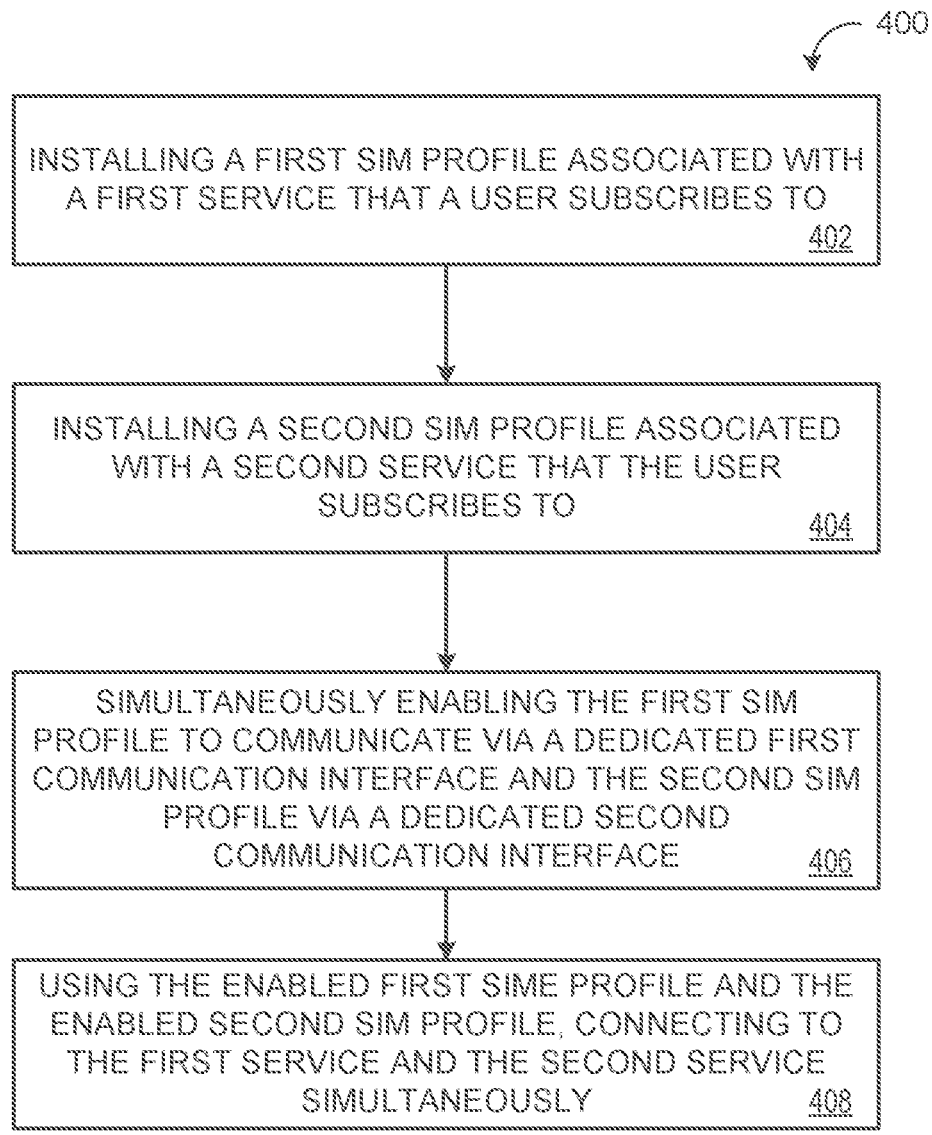
FIG. 4 is a flowchart of an example arrangement of operations for a method of supporting multiple enabled profiles on a single eSIM chip.

FIG. 4 provides an example arrangement of operations for a method 400 of enabling multiple SIM profiles 168 on a single eSIM chip 166. At block 402, the method 400 includes installing, by data processing hardware 161 of a user device 160 associated with a user 10, a first SIM profile 168a associated with a first mobile communication service 169a that the user 10 subscribes to. At block 404, the method 400 includes installing, by the data processing hardware 161, a second SIM profile 168b associated with a second mobile communication service 169b that the user 10 subscribes to. In some examples, the second mobile communication service 169b is different than the first mobile communication service 169a. In other examples, the first mobile communication service 169a and the second mobile communication service 169b are the same type of mobile communication service. The first and second mobile communication services 169a, 169b may be associated with the same MNO 110 or different MNOs 110.

The method 400, at block 406, includes simultaneously enabling, by the data processing hardware 161, the first SIM profile 168a to communicate with the data processing hardware 161 via a dedicated first communication interface 200a, 212a and the second SIM profile 168b to communicate with the data processing hardware 161 via a dedicated second communication interface 200b, 212b. The first communication interface 200a, 212a connects the eSIM 166 to the data processing hardware 161 and the second communication interface 200b, 212b also connects the eSIM 166 to the data processing hardware 161. In some implementations, the first communication interface 212a and the second communication interface 212b are associated with separate and independent physical interfaces 210a, 210b. For example, the communication interfaces may be ISO7816 interfaces using a T=0 transmission protocol.

At block 408, using the enabled first SIM profile 168a and the enabled second SIM profile 168b, the method 400 includes connecting, by the data processing hardware 161, to the first mobile communication service 169a and the second mobile communication service 169b simultaneously. Optionally, in response to connecting to the first mobile communication service 169a and the second mobile communication service 169b, simultaneously, the method 400 includes adjusting, by the data processing hardware 161, a schedule of embedded SIM operations. For example, the SIM operations may include SIM reset operations.

Figure 5:
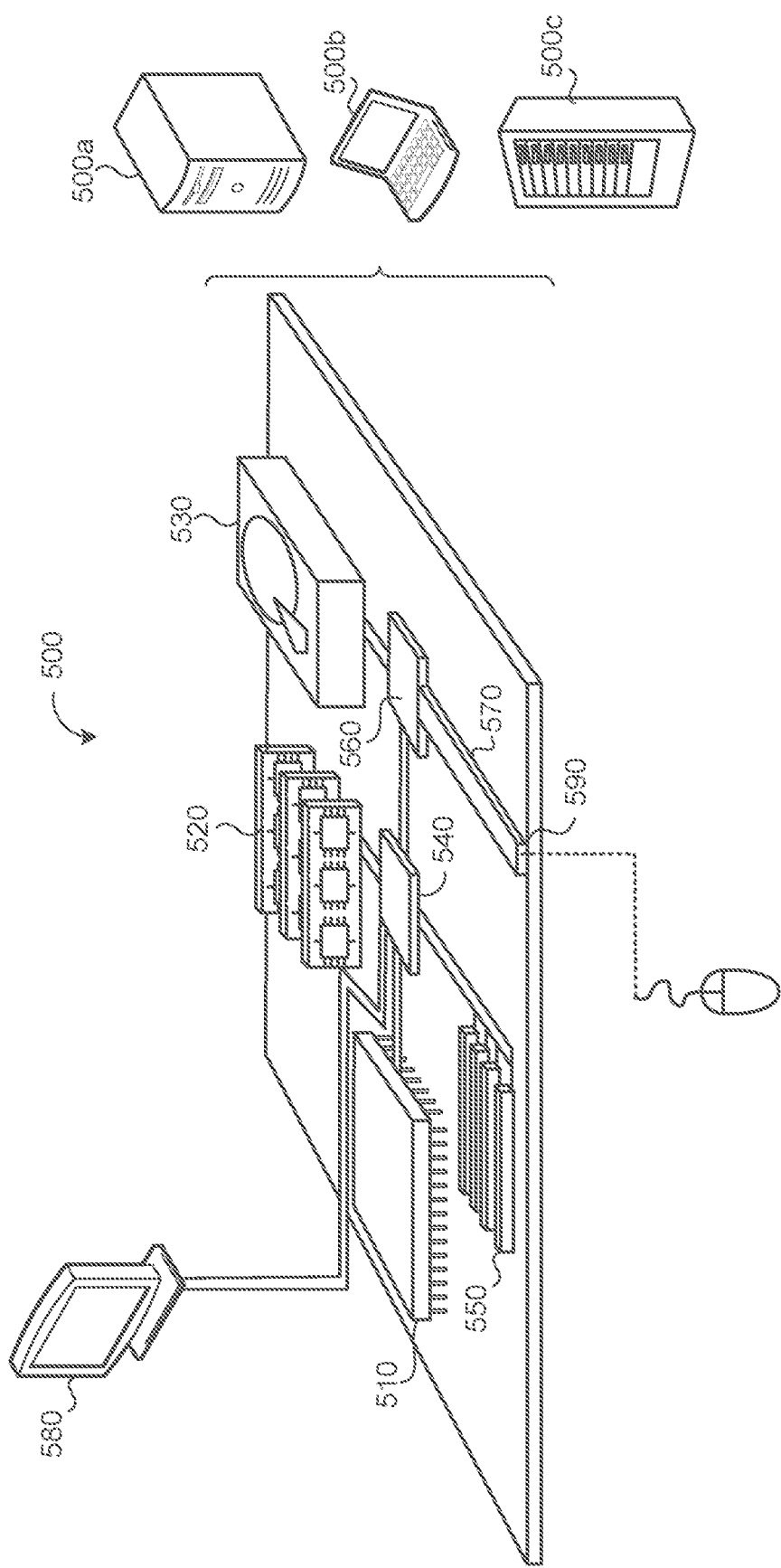
FIG. 5 is a schematic view of an example computing device that may be used to implement the systems and methods described herein.

FIG. 5 is schematic view of an example computing device 500 (e.g., data processing hardware 161) that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for enabling multiple subscriber identification module (SIM) profiles on a single embedded SIM, the method comprising:
    installing, by data processing hardware of a user device associated with a user, a first SIM profile associated with a first mobile communication service that the user subscribes to;
    installing, by the data processing hardware, a second SIM profile associated with a second mobile communication service that the user subscribes to, the second mobile communication service different than the first mobile communication service;
    simultaneously enabling, by the data processing hardware:
        the first SIM profile to communicate with the data processing hardware via a dedicated first communication interface, the first communication interface connecting the embedded SIM to the data processing hardware; and
        the second SIM profile to communicate with the data processing hardware via a dedicated second communication interface, the second communication interface connecting the embedded SIM to the data processing hardware;
    when using the enabled first SIM profile and the enabled second SIM profile, connecting, by the data processing hardware, to the first mobile communication service and the second mobile communication service simultaneously; and
    in response to connecting to the first mobile communication service and the second mobile communication service simultaneously, adjusting, by the data processing hardware, a schedule of embedded SIM operations.

2. The method of claim 1, wherein the first mobile communication service and the second mobile communication service comprise a same type of mobile communication service.

3. The method of claim 1, wherein the first mobile communication service comprises a different type of mobile communication service than the second mobile communication service.

4. The method of claim 1, wherein the first mobile communication service and the second mobile communication service are associated with a same mobile network operator (MNO).

5. The method of claim 1, wherein the first mobile communication service is associated with a first mobile network operator (MNO) and the second mobile communication service is associated with a second MNO different than the first MNO.

6. The method of claim 1, wherein the first communication interface is associated with a first physical interface and the second communication interface is associated with a second physical interface, the second physical interface independent from the first physical interface.

7. The method of claim 6, wherein the first physical interface and the second physical interface comprise independent ISO7816 interfaces.

8. The method of claim 7, wherein the first physical interface and the second physical interface use a T=0 transmission protocol.

9. The method of claim 1, wherein the first communication interface and the second communication interface are multiplexed on a single physical interface.

10. The method of claim 9, wherein the first communication interface and the second communication interface are multiplexed on the single physical interface using a T=1 transmission protocol.

11. The method of claim 1, wherein the schedule of embedded SIM operations comprise SIM reset operations.

12. The method of claim 1, wherein the first SIM profile is associated with a first identification and the second SIM profile is associated with a second identification, the first identification being the same as the second identification.

13. A user device comprising:
    an embedded subscriber identification module (SIM);
    a baseband processor connected to the embedded SIM via two or more communication interfaces; and
    memory hardware in communication with the baseband processor and storing instructions that when executed by the baseband processor cause the baseband processor to perform operations comprising:
        installing, on the embedded SIM, a first SIM profile associated with a first mobile communication service that a user of the user device subscribes to;
        installing, on the embedded SIM, a second SIM profile associated with a second mobile communication service that the user subscribes to, the second mobile communication service different than the first mobile communication service;
        simultaneously enabling:

the first SIM profile to communicate with the baseband processor via a dedicated first communication interface, the first communication interface connecting the embedded SIM to the baseband processor; and the second SIM profile to communicate with the baseband processor via a dedicated second communication interface, the second communication interface connecting the embedded SIM to the baseband processor;

when using the enabled first SIM profile and the enabled second SIM profile, connecting to the first mobile communication service and the second mobile communication service simultaneously; and in response to connecting to the first mobile communication service and the second mobile communication service simultaneously, adjusting a schedule of embedded SIM operations.

14. The user device of claim 13, wherein the first mobile communication service and the second mobile communication service comprise a same type of mobile communication service.

15. The user device of claim 13, wherein the first mobile communication service comprises a different type of mobile communication service than the second mobile communication service.

16. The user device of claim 13, wherein the first mobile communication service and the second mobile communication service are associated with a same mobile network operator (MNO).

17. The user device of claim 13, wherein the first mobile communication service is associated with a first mobile network operator (MNO) and the second mobile communication service is associated with a second MNO different than the first MNO.

18. The user device of claim 13, wherein the first communication interface is associated with a first physical interface and the second communication interface is associated with a second physical interface, the second physical interface independent from the first physical interface.

19. The user device of claim 18, wherein the first physical interface and the second physical interface comprise independent ISO7816 interfaces.

20. The user device of claim 19, wherein the first physical interface and the second physical interface use a T=0 transmission protocol.

21. The user device of claim 13, wherein the first communication interface and the second communication interface are multiplexed on a single physical interface.

22. The user device of claim 21, wherein the first communication interface and the second communication interface are multiplexed on the single physical interface using a T=1 transmission protocol.

23. The user device of claim 13, wherein the schedule of embedded SIM operations comprise SIM reset operations.

24. The user device of claim 13, wherein the first SIM profile is associated with a first identification and the second SIM profile is associated with a second identification, the first identification being the same as the second identification.

* * * * *